US007453356B2

(12) United States Patent
Bedenko

(10) Patent No.: US 7,453,356 B2
(45) Date of Patent: Nov. 18, 2008

(54) VEHICLE TRACKING SYSTEM

(75) Inventor: Edward James Bedenko, Sarasota, FL (US)

(73) Assignee: Honeywell International Inc., Morristown, NJ (US)

(*) Notice: Subject to any disclaimer, the term of this patent is extended or adjusted under 35 U.S.C. 154(b) by 481 days.

(21) Appl. No.: 11/300,741

(22) Filed: Dec. 15, 2005

(65) Prior Publication Data

US 2007/0139223 A1 Jun. 21, 2007

(51) Int. Cl.
*G08B 1/08* (2006.01)
*H04Q 7/00* (2006.01)

(52) U.S. Cl. .............................. 340/539.13; 340/539.1; 701/213; 102/502

(58) Field of Classification Search .............. 340/539.1, 340/539.13; 701/213; 102/502
See application file for complete search history.

(56) References Cited

U.S. PATENT DOCUMENTS

| | | | | |
|---|---|---|---|---|
| 5,223,844 | A | 6/1993 | Mansell et al. | |
| 5,333,881 | A | 8/1994 | Cugliari | |
| 5,731,785 | A | 3/1998 | Lemelson et al. | |
| 5,918,183 | A | 6/1999 | Janky et al. | |
| 6,072,248 | A | 6/2000 | Muise et al. | |
| 6,135,226 | A | 10/2000 | Persichini et al. | |
| 6,409,617 | B1 | 6/2002 | Armold | |
| 6,470,260 | B2 | 10/2002 | Martens et al. | |
| 6,512,478 | B1 * | 1/2003 | Chien | 340/572.1 |
| 6,814,678 | B2 | 11/2004 | Cyr et al. | |
| 7,113,097 | B2 | 9/2006 | Kline et al. | |
| 7,207,274 | B1 | 4/2007 | Plew et al. | |
| 2003/0137448 | A1 | 7/2003 | Brydges et al. | |
| 2004/0065247 | A1 * | 4/2004 | Horton | 114/322 |

FOREIGN PATENT DOCUMENTS

| | | |
|---|---|---|
| GB | 2 385 374 | 8/2003 |

* cited by examiner

*Primary Examiner*—George A Bugg
*Assistant Examiner*—Samuel J Walk
(74) *Attorney, Agent, or Firm*—Fogg & Powers LLC

(57) ABSTRACT

A system for tracking a motor vehicle is disclosed, which includes a device that can be magnetically or mechanically affixed to a vehicle. For one example, the device includes a GPS receiver and a data transmitter. When the device is activated and affixed to a vehicle, the GPS receiver provides to the data transmitter latitudinal and longitudinal earth-referenced coordinate data representing the current position of the vehicle. The data transmitter transmits the coordinate data, which is received by a suitable data receiver at a remote distance from the vehicle involved. Thus, the device enables law enforcement personnel to remotely monitor and track the vehicle's movements, without being seen by the suspect driver and encouraging a high speed chase. Also, the device provides a relatively inexpensive vehicle tracking solution for those municipalities that have a "no chase" policy and cannot afford the expense of a helicopter for vehicle pursuits.

18 Claims, 1 Drawing Sheet

VEHICLE TRACKING SYSTEM

FIELD OF THE INVENTION

The present invention relates generally to the field of vehicle tracking systems, and more specifically, but not exclusively, to a system for tracking motor vehicles for law enforcement purposes.

BACKGROUND OF THE INVENTION

There are countless numbers of high speed police pursuits of vehicles that occur each year. Although these pursuits are often necessary to apprehend dangerous criminals, they often result in high speed collisions that cause serious or fatal injuries to the police, innocent motorists or pedestrians, and even the criminals being chased. Ironically, it is both the pursuit by the police and the criminal's desire not to be caught that fuel the high speed chase. Consequently, if there is no pursuit by the police, a high speed chase would not occur. However, if a law enforcement agency has a "no chase" policy, then the crime rate in that jurisdiction is likely to increase as a result. Therefore, a need exists for a system that law enforcement personnel can use to track the movement of a suspect motor vehicle without encouraging a high speed chase. As described in detail below, the present invention provides such a system, which resolves the existing safety problems associated with high speed pursuits, and other similar problems.

SUMMARY OF THE INVENTION

The present invention provides a system for tracking a motor vehicle, which includes a device that can be magnetically or mechanically affixed to a vehicle. In a preferred embodiment of the present invention, the device includes a GPS receiver and a data transmitter. When the device is activated and affixed to a vehicle, the GPS receiver provides to the data transmitter latitudinal and longitudinal earth-referenced coordinate data representing the current position of the vehicle. The data transmitter transmits the coordinate data, which is received by a suitable data receiver at a remote distance from the vehicle involved. Thus, the present invention enables law enforcement personnel to remotely monitor and track the vehicle's movements, without being seen by the suspect driver and encouraging a high speed chase. Also, the present invention provides a relatively inexpensive vehicle tracking solution for those municipalities that have a "no chase" policy and cannot afford the expense of a helicopter for vehicle pursuits.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
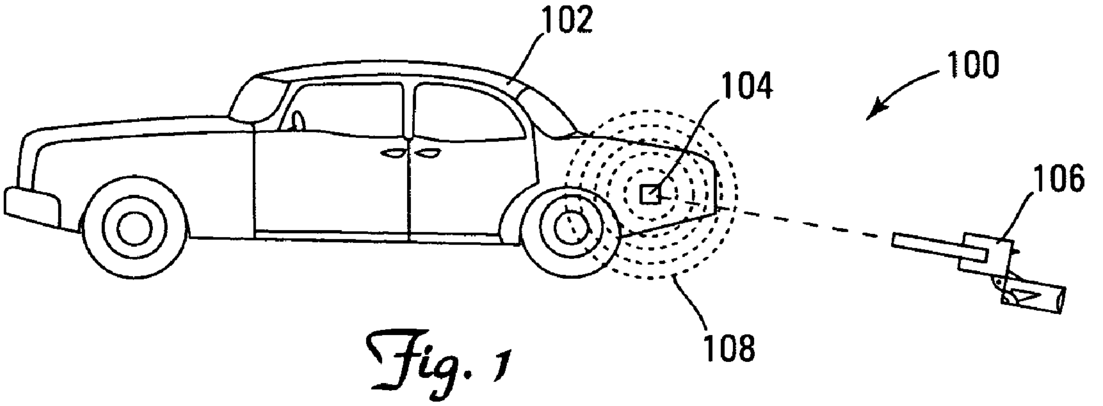
FIG. 1 depicts a drawing showing an example system for tracking a vehicle, which illustrates a preferred embodiment of the present invention.

With reference now to the figures, FIG. 1 depicts a drawing showing an example system 100 for tracking a vehicle, which illustrates a preferred embodiment of the present invention. For this example embodiment, system 100 includes a target vehicle 102, a vehicle tracking system 104, and a launch device 106. As shown, the launch device 106 has propelled the vehicle tracking system 104 at the target vehicle 102, and the vehicle tracking system 104 is affixed to the target vehicle 102. It may be assumed for this example that a law enforcement officer has triggered the propelling operation of the launch device 106. The vehicle tracking system 104 is transmitting GPS coordinate data (e.g., transmission indicated by the dashed circles 108) that represent the current location of the target vehicle 102. Thus, in accordance with the present invention, law enforcement personnel can receive the transmitted GPS coordinate data 108 with a suitable data receiver (not shown) at a remote distance from the target vehicle 102, and continuously monitor the travel of the target vehicle 102 without being seen by its driver.

For illustrative purposes only in this example embodiment, and not intended as an architectural limitation to be imposed on the scope of the present invention, launch device 106 can be, for example, a 40 mm gun that fires 40 mm rounds. For example, launch device 106 can be a hand-held firearm used by law enforcement and military personnel to launch so-called bean bag "bullets". Thus, launch device 106 can fire a 40 mm cartridge similar in shape and function to a large shotgun shell. The explosive action of the 40 mm cartridge being fired propels the bean bag "bullet" at the target vehicle 102. As such, for this example embodiment, it may be assumed that the vehicle tracking system 104 is disposed within a bean bag "bullet" that has been fired by the operation of launch device 106. However, launch device 106 can also be a compressed gas operated launch device (e.g., so-called $CO_2$ gun) that can propel a bean bag "bullet" (including vehicle tracking system 104) at the target vehicle 106. In other words, launch device 106 can be implemented with any suitable device capable of launching a bean bag, bean bag "bullet", or similar type of device including vehicle tracking system 104 disposed within. Additionally, for a second embodiment of the present invention, a bean bag type of device including a vehicle tracking system (e.g., 104) can be hand-held and thrown by a law enforcement officer at the target vehicle 102. As described in detail below, for this example embodiment, the bean bag "bullet" device (e.g., or hand-held bean bag device) including vehicle tracking system 104 disposed within, is a magnetic device that becomes affixed magnetically to a metal section of the target vehicle 102 upon contact.

Figure 2:
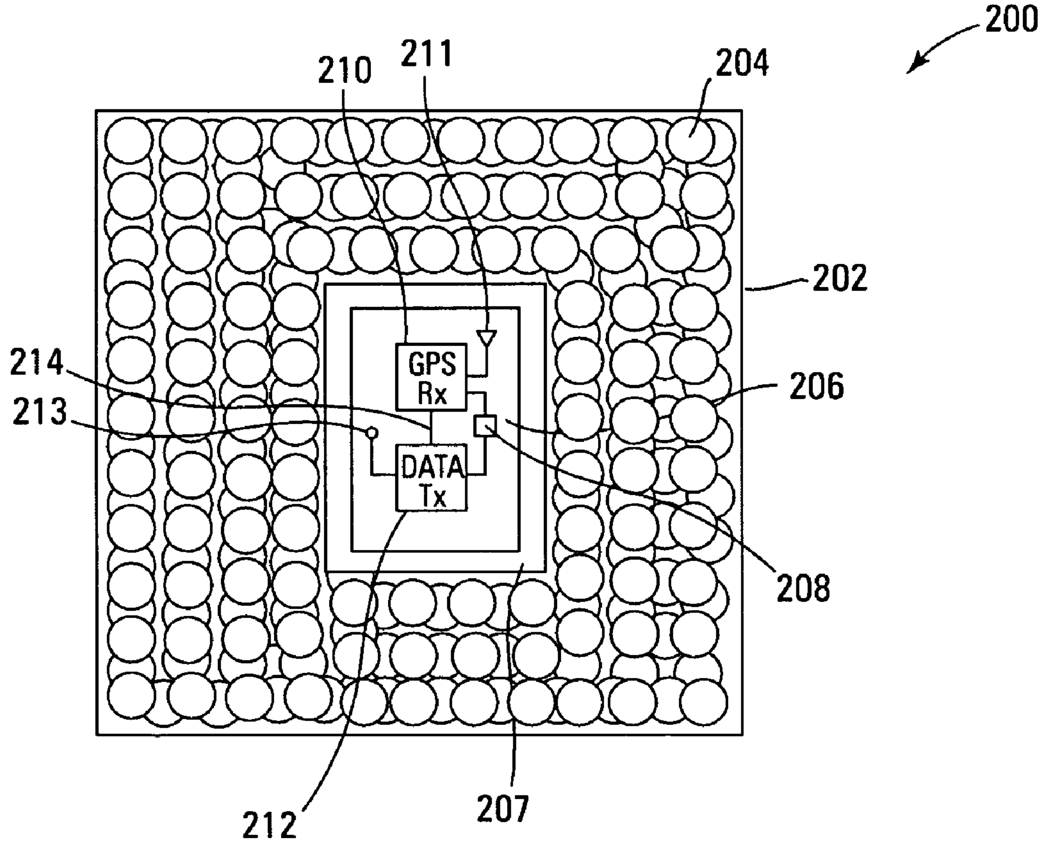
FIG. 2 depicts a pictorial representation of an example system for tracking vehicles, which can be used to implement the example vehicle tracking system shown in FIG. 1.

FIG. 2 depicts a pictorial representation of an example system 200 for tracking vehicles, which can be used to implement the example vehicle tracking system 104 shown in FIG. 1. For this example embodiment, system 200 includes a bean bag (or similar type of) device 202, a plurality of magnetized metallic balls 204 disposed within bean bag device 202, and a vehicle tracking subsystem 206 disposed substantially within the center region of bean bag device 202. Thus, vehicle tracking subsystem 206 is disposed within bean bag device 202 and substantially surrounded on all sides by the magnetized balls 204. Notably, it should be understood that not all of the balls 204 need to be metallic and/or magnetized. In other words, some of the balls 204 can be made from a non-metallic material (e.g., plastic, etc.). In any event, for this example embodiment, vehicle tracking subsystem 206 can be enclosed within a plastic (e.g. Lucite) material, polymer material, or other suitable hard or soft material (e.g., identified generally as enclosure 207) capable of mechanically isolating the electrical and electronic components of vehicle tracking subsystem 206 from the plurality of magnetized metallic balls 204. Also, for this example embodiment, vehicle tracking subsystem 206 includes a GPS receiver unit 210 with a corresponding receive antenna 211, a data transmitter unit 212 with a corresponding transmit antenna 213, a data link 214 for coupling GPS coordinate data received by GPS receiver unit 210 to data transmitter unit 212, and a power source 208 connected to GPS receiver unit 210 and data transmitter unit 212.

Notably, in order to conserve power, the power source 208 can be disconnected from the GPS receiver unit 210 and data transmitter unit 212 until the vehicle tracking subsystem 206 is to be used. For example, an insulating "pin" can be inserted between two spring-loaded electrical contacts disposed within vehicle tracking subsystem 206. The electrical contacts can be connected in series with the output of power source 208 and the power inputs to GPS receiver unit 210 and data transmitter unit 212. Thus, when the "pin" is pulled, the spring-loaded electrical contacts make electrical contact and power is supplied to GPS receiver unit 210 and data transmitter unit 212. For example, if bean bag device 202 is a hand-held device, the pin can extend outside the bean bag device and be "pulled" by hand. As another example, if the bean bag device 202 is to be propelled by a gun, then the pin can extend outside the bean bag device and be affixed to the inside of the cartridge. When the gun is fired, the bean bag device 202 is expelled from the cartridge and the pin is thus pulled. In any event, there are a number of suitable techniques that exist, which can be used to activate power source 208 and vehicle tracking subsystem 206 when system 200 is to be used for tracking a target vehicle.

When activated, for this example embodiment, power source 208 provides power for the operation of GPS receiver unit 210 and data transmitter unit 212. Thus, in operation, system 200 can be launched or thrown at a metallic section of a target vehicle (e.g., target vehicle 102 in FIG. 1), the magnetized balls 204 function to strongly affix the bean bag device 202 to the metal section of the target vehicle, and data transmitter unit 212 transmits the GPS coordinate data for the target vehicle as the data is received by GPS receiver unit 210. In accordance with the present invention, law enforcement personnel can receive the transmitted GPS coordinate data with a suitable data receiver unit, and monitor the travel of the target vehicle without being seen its driver.

It is important to note that while the present invention has been described in the context of a fully functioning system for tracking a motor vehicle, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular system for tracking a motor vehicle.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for tracking a vehicle, comprising:

a navigation receiver unit;

a data transmitter unit, said data transmitter unit coupled to said navigation receiver unit; and a magnetized device, said magnetized device mechanically affixed to said navigation receiver unit and said data transmitter unit, wherein said magnetized device comprises a magnetized bean bag.

2. The system of claim 1, wherein said navigation receiver unit comprises a GPS receiver.

3. The system of claim 1, wherein said magnetized bean bag comprises a bag including a plurality of magnetized balls.

4. The system of claim 1, wherein said navigation receiver unit and said data transmitter unit are disposed within a center portion of said magnetized bean bag.

5. The system of claim 1, wherein said magnetized device comprises at least one bar magnet affixed to said navigation receiver unit and said data transmitter unit.

6. The system of claim 1, wherein said navigation receiver unit and said data transmitter unit are disposed within at least one of a plastic material enclosure or polymer material enclosure.

7. The system of claim 1, further comprising a launch device, said launch device operable to propel said system at a target vehicle.

8. The system of claim 1, further comprising a power source coupled to said navigation receiver unit and said data transmitter unit.

9. The system of claim 1, comprising:

means for determining and transmitting at least one location for a motor vehicle.

10. The system of claim 1, wherein said navigation receiver unit and said data transmitter unit are enclosed within at least one of a plastic material enclosure or polymer material enclosure to mechanically isolate the electrical and electronic components of vehicle tracking subsystem from the magnetized bean bag.

11. A vehicle tracking system, comprising:

means for determining at least one location of a moving vehicle;

means for transmitting data associated with said at least one location of said moving vehicle; and means for magnetically affixing said means for determining and said means for transmitting to said moving vehicle, wherein said means for magnetically affixing comprises a magnetized bean bag.

12. The system of claim 11, wherein said means for determining comprises a navigation receiver.

13. The system of claim 11, wherein said magnetized bean bag comprises a bag including a plurality of magnetized balls.

14. A method for tracking a vehicle, comprising the steps of:

determining at least one location of a moving vehicle;

coupling data associated with said at least one location to a data transmitter;

transmitting said data associated with said at least one location; and magnetically affixing said data transmitter to said moving vehicle, wherein the magnetically affixing step is performed with a magnetized bean bag.

15. The method of claim 14, wherein the determining step is performed by a GPS receiver.

16. The method of claim 14, further comprising the step of:

supplying power to said data transmitter only during an operational state.

17. A computer program product, comprising:

a computer-usable medium having computer-readable code embodied therein for configuring a computer processor, the computer program product comprising:

a first executable computer-readable code configured to cause a computer processor to determine at least one location of a moving vehicle, wherein the first executable computer-readable code is housed in proximity to a magnetic bean bag that is mechanically affixed to said moving vehicle;

a second executable computer-readable code configured to cause a computer processor to couple data associated with said at least one location to a data transmitter; and a third executable computer-readable code configured to cause a computer processor to cause said data transmitter to transmit said data associated with said at least one location.

18. The computer program product of claim 17, further comprising:

a fourth executable computer-readable code configured to cause a computer processor to cause a power source to supply power to said data transmitter only during an operational state.

* * * * *

US007453356C1

(12) EX PARTE REEXAMINATION CERTIFICATE (8836th)

United States Patent

Bedenko

(10) Number: US 7,453,356 C1

(45) Certificate Issued: Jan. 31, 2012

(54) VEHICLE TRACKING SYSTEM

(75) Inventor: Edward James Bedenko, Sarasota, FL (US)

(73) Assignee: Honeywell International Inc., Morristown, NJ (US)

Reexamination Request:
No. 90/010,516, Jun. 19, 2009

Reexamination Certificate for:

| | |
|---|---|
| Patent No.: | **7,453,356** |
| Issued: | **Nov. 18, 2008** |
| Appl. No.: | **11/300,741** |
| Filed: | **Dec. 15, 2005** |

(51) Int. Cl.

| | |
|---|---|
| ***G08B 1/08*** | (2006.01) |
| ***H04Q 7/00*** | (2006.01) |

(52) U.S. Cl. ................ 340/539.13; 102/502; 340/539.1; 701/213

(58) Field of Classification Search ........................ None
See application file for complete search history.

(56) References Cited

To view the complete listing of prior art documents cited during the proceeding for Reexamination Control Number 90/010,516, please refer to the USPTO's public Patent Application Information Retrieval (PAIR) system under the Display References tab.

*Primary Examiner*—Scott L. Weaver

(57) ABSTRACT

A system for tracking a motor vehicle is disclosed, which includes a device that can be magnetically or mechanically affixed to a vehicle. For one example, the device includes a GPS receiver and a data transmitter. When the device is activated and affixed to a vehicle, the GPS receiver provides to the data transmitter latitudinal and longitudinal earth-referenced coordinate data representing the current position of the vehicle. The data transmitter transmits the coordinate data, which is received by a suitable data receiver at a remote distance from the vehicle involved. Thus, the device enables law enforcement personnel to remotely monitor and track the vehicle's movements, without being seen by the suspect driver and encouraging a high speed chase. Also, the device provides a relatively inexpensive vehicle tracking solution for those municipalities that have a "no chase" policy and cannot afford the expense of a helicopter for vehicle pursuits.

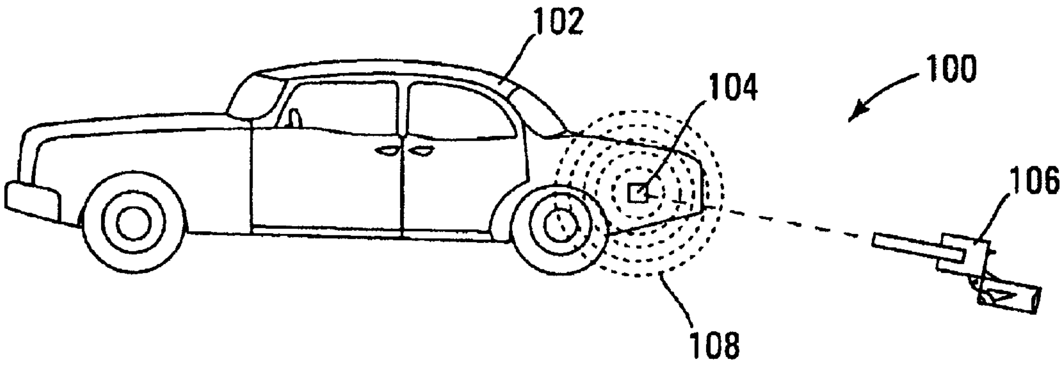

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *